United States Patent [19]
Fujii

[11] Patent Number: 5,216,551
[45] Date of Patent: Jun. 1, 1993

[54] SURFACE REFLECTOR

[75] Inventor: Hideo Fujii, Tokyo, Japan

[73] Assignee: Asahi Kogaku Kogyo K.K., Tokyo, Japan

[21] Appl. No.: 654,422

[22] Filed: Feb. 12, 1991

[30] Foreign Application Priority Data

| Feb. 16, 1990 | [JP] | Japan | 2-035809 |
|---|---|---|---|
| Feb. 16, 1990 | [JP] | Japan | 2-035810 |
| Feb. 16, 1990 | [JP] | Japan | 2-035811 |
| Mar. 23, 1990 | [JP] | Japan | 2-073622 |
| Nov. 21, 1990 | [JP] | Japan | 2-317099 |

[51] Int. Cl.⁵ .............................. G02B 5/08
[52] U.S. Cl. ........................ 359/884; 359/883; 359/584; 359/585; 427/419.2; 427/419.7; 428/688; 428/698
[58] Field of Search ............ 359/883, 889, 584, 585, 359/589; 422/164, 419.1, 419.2, 419.7; 428/688, 698

[56] References Cited

U.S. PATENT DOCUMENTS

| 3,601,471 | 8/1971 | Seddon | 359/584 |
|---|---|---|---|
| 4,189,205 | 2/1980 | Vandehei | 359/589 |
| 4,322,130 | 3/1982 | Ito et al. | 359/584 |
| 4,482,209 | 11/1984 | Grewal et al. | 359/583 |
| 4,610,771 | 9/1986 | Gillery | 204/192.1 |
| 4,919,778 | 4/1990 | Dietrich | 204/192.27 |
| 4,933,823 | 6/1990 | Taylor | 359/884 |
| 5,019,458 | 5/1991 | Elgat et al. | 359/883 |

FOREIGN PATENT DOCUMENTS

| 0185314 | 12/1985 | European Pat. Off. |
|---|---|---|
| 0339274 | 3/1989 | European Pat. Off. |
| 0363747 | 9/1989 | European Pat. Off. |
| 0378917 | 12/1989 | European Pat. Off. |
| 52-40348 | 3/1977 | Japan |
| 6326603 | 2/1988 | Japan |
| 64-84215 | 3/1989 | Japan |
| 1-319701 | 12/1989 | Japan |
| 605871 | 8/1948 | United Kingdom |
| 998584 | 7/1965 | United Kingdom |
| 1358072 | 6/1974 | United Kingdom |
| 1367590 | 9/1974 | United Kingdom |
| 1419036 | 12/1975 | United Kingdom |
| 1460784 | 1/1977 | United Kingdom |
| 1513826 | 6/1978 | United Kingdom |
| 2126256A | 3/1984 | United Kingdom |
| 2186001 | 8/1987 | United Kingdom |
| 2229737 | 10/1990 | United Kingdom |
| 2229738 | 10/1990 | United Kingdom |

OTHER PUBLICATIONS

L. Holland, "Vacuum Deposition on Thin Films", 1956, pp. 341–343.
Francombe et al, "Physics of Thin Films", 19082, vol. 12, pp. 25–32.

*Primary Examiner*—Carolyn E. Fields
*Assistant Examiner*—Drew A. Dunn
*Attorney, Agent, or Firm*—Sughrue, Mion, Zinn, Macpeak & Seas

[57] ABSTRACT

A surface reflector according to a first aspect has an oxide undercoat formed on a substrate, a reflecting aluminum layer formed over the oxide undercoat, and a protective layer formed over the reflecting layer. A surface reflector according to a second aspect has a chromium sulfide undercoat formed on a substrate, a reflecting silver layer formed over the chromium sulfide undercoat, and a protective layer formed over the reflecting layer. A surface reflector according to a third aspect has an oxide undercoat formed on a substrate, a sulfide undercoat formed over the oxide undercoat, a reflecting silver layer formed over the sulfide undercoat, and a protective layer formed over the reflecting layer. The surface reflector according to a fourth aspect has a chromium sulfide undercoat formed on a substrate, a reflecting silver layer formed over said chromium sulfide undercoat, a protective layer (I) made of chromium sulfide that is formed over said reflecting layer, and a protective layer (II) formed over the protective layer (I). The surface reflector according to a fifth aspect has a protective silicon dioxide layer (III) formed over the protective layer (II) of the surface reflector according to the fourth aspect.

23 Claims, 7 Drawing Sheets

A : BEFORE TEST
B : AFTER 504-H EXPOSURE TEST

A: BEFORE TEST
B: AFTER 216-H EXPOSURE TEST ved silicon oxide" in Appl. Opt., 14 (1975), 2639].
SURFACE REFLECTOR

BACKGROUND OF THE INVENTION

The present invention relates to a surface reflector having a surface reflecting multilayer film for use with optical instruments such as a camera, a telescope and a microscope.

Aluminum is commonly used as a reflective material for surface reflectors used in optical instruments. However, single-layered films of aluminum have the disadvantage that they are low in mechanical strength, film adhesion to the substrate, moisture resistance and the like. To solve this problem, a protective layer is formed on the single-layered aluminum film and the resulting multilayer arrangement has improved mechanical strength, film adhesion to the substrate and moisture resistance.

For example, FIG. 1 shows a conventional two-layer arrangement which comprises a substrate $1c$ that is overlaid with a reflecting aluminum layer $3c$ which in turn is overlaid with a protective layer $4c$ made from aluminum oxide.

Another two-layer arrangement is shown in FIG. 2 and it comprises a substrate $1d$ that is overlaid with a reflecting aluminum layer $3d$ which in turn is overlaid with a protective layer $4d$ made form silicon dioxide.

Further, a conventional three-layer arrangement is shown in FIG. 3 and it comprises a substrate $1e$ that is overlaid with a chromium undercoat $2e$ which in turn is overlaid successively with a reflecting aluminum layer $3e$ and a protective layer $4e$ made from aluminum oxide.

Each of these arrangements will prove effective when the substrate of the surface reflector is made of glass.

Also, silver having high reflectance over the visible to near infrared range is commonly used as a reflective material for high-reflectance surface reflectors used in optical instruments. However, single-layered films of silver have the disadvantage that they are low in film adhesion to substrate, moisture resistance, sulfur resistance and the like. To solve this problem, an undercoat is formed between a substrate and a reflecting silver layer, and a protective layer is formed on the reflecting silver layer. The resulting multilayer arrangement has improved film adhesion to substrate, moisture resistance, sulfur resistance and the like.

For example, FIG. 4 shows a conventional four-layer arrangement which comprises a substrate $1f$ that is overlaid with an aluminum oxide undercoat $2f$ which in turn is overlaid with a reflecting silver layer $3f$. Over the reflecting layer $3f$, an aluminum oxide layer $4f$ and a silicon dioxide layer $5f$ are successively formed as protective layers [see "Reflectance and durability of Ag mirrors coated with thin layers of $Al_2O_3$ plus reactively deposited silicon oxide" in Appl. Opt., 14 (1975), 2639].

FIG. 5 shows a conventional six-layer arrangement which comprises a substrate $1g$ that is overlaid with a copper undercoat $2g$ which in turn is overlaid with a reflecting silver layer $3g$. Over the reflecting layer $3g$, an aluminum oxide layer $4g$, a tantalum oxide layer $5g$, a silicon dioxide layer $6g$ and a tantalum oxide layer $7g$ are successively formed as protective layers [see "Progress in the development of a durable silver-based high-reflectance coating for astronomical telescopes" in Appl. Opt., 24 (1985), 1164].

Each of these arrangements will prove effective when the substrate of the surface reflector is made of glass.

With the recent advances in the technology of molding plastics including polycarbonates, polyesters, acrylic resins and the like, and with the advantage of plastics that they can be molded into complex shapes more easily than glass, the use of plastics in optical parts has increased.

For example, polygonal mirrors used in a laser scanner and other optical devices are desirably made from plastics in order to reduce the device's cost and weight. Also, pentaprisms as camera parts are desirably made from plastics in order to reduce the cost of the camera, and products having a surface reflecting film formed in a hollow pentagonal molded article have begun to be used. However, surface reflectors using a substrate made of plastics such as polycarbonates, polyesters or acrylic resins have the disadvantage that they have lower film adhesion to the substrate, moisture resistance, sulfur resistance and the like than reflectors using a glass substrate if they adopt the multilayer arrangements described above.

SUMMARY OF THE INVENTION

An object, therefore, of the present invention is to provide a surface reflector that insures high film adhesion to substrate, moisture resistance, sulfur resistance, abrasion resistance and the like even if the substrate is formed of plastics such as polycarbonates, polyesters or acrylic resins.

A surface reflector according to a first aspect of the present invention has (a) an oxide undercoat formed on the surface of a substrate, (b) a reflecting aluminum layer formed over the oxide undercoat, and (c) a protective layer formed over the reflecting layer.

According to the first aspect of the present invention, the oxide undercoat that has strong adhesion to the substrate of the surface reflector is formed over the substrate and the reflecting aluminum layer is formed over the oxide undercoat. This arrangement enhances the film adhesion of the reflecting layer to the substrate even if the latter is formed of plastics such as polycarbonates, polyesters or acrylic resins. As a result, the surface reflector exhibits high film adhesion to the substrate, moisture resistance and the like.

A surface reflector according to a second aspect of the present invention has (a) a chromium sulfide undercoat formed on the surface of a substrate, (b) a reflecting silver layer formed over the chromium sulfide undercoat, and (c) a protective layer formed over the reflecting layer.

According to the second aspect of the present invention, the chromium sulfide undercoat that has strong adhesion to the substrate of the surface reflector is formed over the substrate and the reflecting silver layer is formed over the chromium sulfide undercoat. This arrangement enhances the film adhesion of the reflecting layer to the substrate even if the latter is formed of plastics such as polycarbonates, polyesters or acrylic resins. As a result, the surface reflector exhibits high film adhesion to the substrate, moisture resistance and the like.

A surface reflector according to a third aspect of the present invention has (a) an oxide undercoat formed on the surface of a substrate, (b) a sulfide undercoat formed over the oxide undercoat, (c) a reflecting silver layer formed over the sulfide undercoat, and (d) a protective layer formed over the reflecting layer.

According to the third aspect of the present invention, the oxide undercoat that has strong adhesion to the substrate of the surface reflector is formed over the substrate and the sulfide undercoat is formed over the oxide undercoat, with the reflecting silver layer being then formed over the sulfide undercoat. This arrangement enhances the film adhesion of the reflecting layer to the substrate even if the latter is formed of plastics such as polycarbonates, polyesters or acrylic resins. As a result, the surface reflector exhibits high film adhesion to the substrate, moisture resistance and the like.

A surface reflector according to a fourth aspect of the present invention has (a) a chromium sulfide undercoat formed on the surface of a substrate, (b) a reflecting silver layer formed over the chromium sulfide undercoat, (c) a protective layer (I) made of chromium sulfide that is formed over the reflecting layer, and (d) a protective layer (II) formed over the protective layer (I).

According to the fourth aspect of the present invention, the chromium sulfide undercoat that has strong adhesion to the substrate of the surface reflector is formed over the substrate and the reflecting silver layer is formed over the chromium sulfide undercoat. This arrangement enhances the film adhesion of the reflecting layer to the substrate even if the latter is formed of plastics such as polycarbonates, acrylic resins and polyesters. As a result, the surface reflector exhibits improved film adhesion to the substrate, moisture resistance and the like. Further, in accordance with the present invention, the protective chromium sulfide layer (I) is formed over the reflecting silver layer. This effectively prevents the ingress of sulfide ions into the reflecting layer, whereby the surface reflector exhibits high film adhesion to the substrate, moisture resistance, sulfur resistance and the like.

A surface reflector according to a fifth aspect of the present invention has (a) a chromium sulfide undercoat formed on the surface of a substrate, (b) a reflecting silver layer formed over the chromium sulfide undercoat, (c) a protective chromium sulfide layer (I) formed over the reflecting layer, (d) a protective layer (II) including at least an aluminum oxide layer, and (e) a protective silicon dioxide layer (III) formed over the protective layer (II).

According to the fifth aspect of the present invention, even if the substrate is formed of plastics such as polycarbonates, acrylic resins and polyesters, the adhesion between the substrate and the reflecting layer can be enhanced by forming the chromium sulfide undercoat between them; the ingress of sulfide ions into the reflecting layer made of silver can be prevented by forming protective layer (I) of chromium sulfide on the reflecting layer; and improved resistance to moisture and abrasion can be achieved by forming the protective layer (II) on the protective layer (I), as well as the outermost protective layer (III) of silicon dioxide over the protective layer (II).

DETAILED DESCRIPTION OF THE INVENTION

Figure 6:
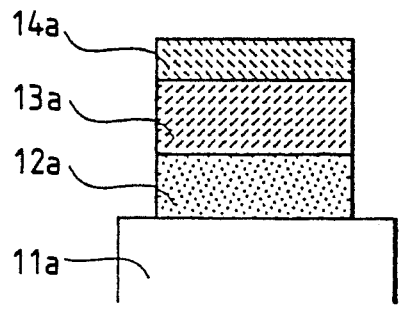
FIG. 6 is a sectional view showing a surface reflector according to a first embodiment of the present invention.

FIG. 6 shows schematically a surface reflector according to a first embodiment of the present invention. The surface reflector has a three-layer arrangement and the individual layers are formed by vacuum evaporation, sputtering or some other suitable techniques. As shown, a substrate 11a formed of a plastic material such as a polycarbonate, polyester or acrylic resin is overlaid with an oxide undercoat 12a which in turn is overlaid successively with a reflecting layer 13a made of aluminum and a protective layer 14a.

The oxide undercoat 12a is formed of an oxide that has strong adhesion to both the reflecting layer made of aluminum and the substrate made of the plastic materials listed above and preferred examples of such oxides are chromium oxide, molybdenum oxide, cobalt oxide, niobium oxide, cerium oxide, titanium oxide, tantalum oxide, silicon dioxide and zirconium oxide. The oxide undercoat 12a preferably has a thickness of at least 10 nm, with the range of 15-70 nm being particularly preferred. If the oxide undercoat 12a is thinner than 10 nm, no adequate adhesion to the substrate can be achieved.

The reflecting aluminum layer 13a which is formed over the oxide undercoat 12a preferably has a thickness of at least 100 nm, with the range of 100-250 nm being particularly preferred. If the reflecting layer 13a is thinner than 100 nm, total reflection will not occur and the resulting reflector will work as a half-mirror.

The protective layer 14a on the reflecting layer 13a is preferably formed of aluminum oxide and it preferably has a thickness of at least 20 nm, with the range of 20-150 nm being particularly preferred. If the protective layer 14a is thinner than 20 nm, the reflecting layer 13a cannot be fully protected.

Figure 7:
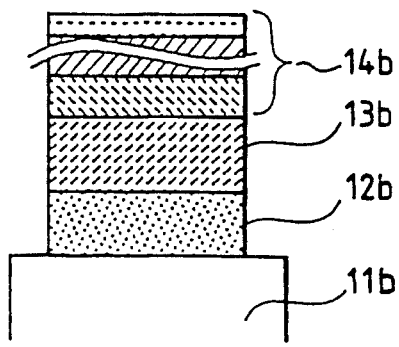
FIG. 7 is a sectional view showing a surface reflector according to a second embodiment of the present invention.

FIG. 7 shows schematically a surface reflector according to a second embodiment of the present invention. In this embodiment, the protective layer 14b is a multilayer film composed of at least one aluminum oxide layer and at least one transparent material layer, but the other layers (undercoat 12b and reflecting layer 13b) are the same as in the embodiment shown in FIG. 6.

Exemplary transparent materials are dielectrics including zirconium oxide, tantalum oxide, titanium oxide, cerium oxide, niobium oxide, silicon dioxide and magnesium fluoride. The layer of such transparent materials preferably has a thickness of at least 20 nm, with the range of 20-150 nm being particularly preferred.

The protective layer may be formed of one aluminum oxide layer and one transparent material layer, but preferably it is formed of 2-5 layers of aluminum oxide and a transparent material superposed alternately.

The following examples are provided for the purpose of further explaning the first and second embodiments of the present invention.

EXAMPLES 1A-9A

To fabricate surface reflectors having the structure shown in FIG. 6, the layers of oxides (see Table 1) were formed in a thickness of 15 nm by vacuum evaporation on a polycarbonate substrate 11a so as to form an oxide undercoat 12a. A reflecting aluminum layer 13a was formed in a thickness of 100 nm on the oxide undercoat 12a by vacuum evaporation. Further, a protective aluminum oxide layer 14a was formed in a thickness of 20 nm on the reflecting layer 13a by vacuum evaporation. In this way, nine samples of surface reflectors were fabricated.

TABLE 1

| Example No. | Oxide in undercoat |
| --- | --- |
| 1A | chromium oxide |
| 2A | molybdenum oxide |
| 3A | cobalt oxide |
| 4A | niobium oxide |
| 5A | cerium oxide |
| 6A | titanium oxide |
| 7A | tantalum oxide |
| 8A | silicon dioxide |
| 9A | zirconium oxide |

The surface reflectors were left to stand in a thermostatic chamber at the temperature of 40° C. and at the humidity of 95% r.h. Until 504 hours passed, a peel test using an adhesive tape was conducted at 24-h intervals in order to examine the film adhesion to substrate and moisture resistance of each sample. In consideration of actual use, the time to peel is desirably 200 h and longer. The test results are shown in Table 3.

Figure 8:
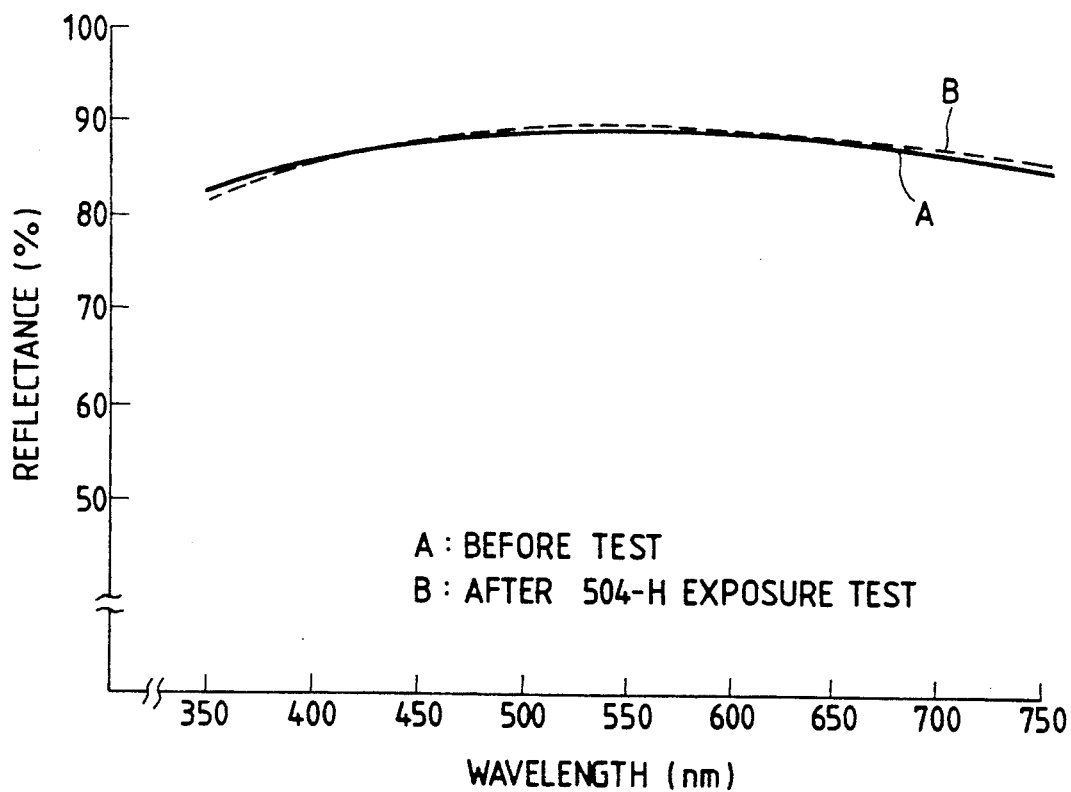
FIG. 8 is a graph showing two profiles of the spectral reflectance of 45° incident light by the surface reflector of Example 1A of the present invention, one profile (solid line A) being the initial and the other (dotted line B) being the data obtained after exposure to 40° C. and 95% r.h. for 504 h.

In Examples 1A-9A, the spectral reflectance of 45° incident light was measured before and after the 504-h exposure to the conditions. Since similar results were obtained, only the result of Example 1A is shown in FIG. 8, from which one can see that the surface reflectors of the present invention experienced little change in the spectral reflectance of 45° incident light even when they were exposed to 40° C. at 95% r.h. for a prolonged time.

EXAMPLE 10A

To fabricate a surface reflector having the structure shown in FIG. 7, the procedure of Example 1 was repeated except that a multi-layered film of transparent material including an aluminum oxide layer was formed as protective layer 14b. The protective layer 14b consisted of an alternate arrangement of a single aluminum oxide layers of 76 nm thickness and two dielectric zirconium oxide layers of 63 nm thickness. The fabricated surface reflector was subjected to peel tests as in Examples 1A-9A and similar results were obtained as regards the film adhesion to substrate and moisture resistance.

COMPARATIVE EXAMPLES 1A-7A

Additional surface reflectors were fabricated as in Examples 1A-9A except that the oxide undercoats were formed of the oxides shown in Table 2. The fabricated surface reflectors were evaluated for film adhesion to substrate and moisture resistance by the same method as used in Examples 1A-9A and the results are shown in Table 3.

TABLE 2

| Comparative Example No. | Oxide in undercoat |
| --- | --- |
| 1A | nickel oxide |
| 2A | aluminum oxide |
| 3A | tungsten oxide |
| 4A | iron oxide |
| 5A | silicon oxide |
| 6A | copper (I) oxide |
| 7A | tin oxide |

COMPARATIVE EXAMPLE 8A

Figure 1:
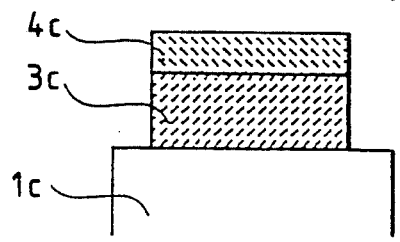
FIGS. 1-5 are sectional views showing prior art surface reflectors.
Figure 2:
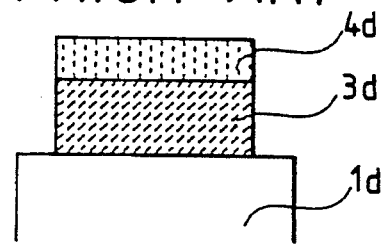

To fabricate a surface reflector having the two-layer structure shown in FIG. 1, a reflecting aluminum layer 3c was formed in a thickness of 100 nm directly on a polycarbonate substrate 1c by vacuum evaporation. Further, a protective aluminum oxide layer 4c was formed in a thickness of 20 nm on the reflective layer 3c by vacuum evaporation. The fabricated surface reflector was evaluated for film adhesion to substrate and moisture resistance by the same method as used in Examples 1A-9A. The results are also shown in Table 3.

COMPARATIVE EXAMPLE 9A

A surface reflector was fabricated as in Comparative Example 8 except that a protective layer 4d having a thickness of 20 nm was formed from silicon dioxide by vacuum evaporation. The fabricated surface reflector was evaluated for film adhesion to substrate and moisture resistance by the same method as used in Examples 1A-9A. The results are shown in Table 3.

COMPARATIVE EXAMPLE 10A

Figure 3:
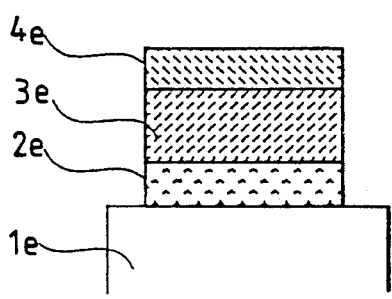

To fabricate a surface reflector having the structure shown in FIG. 3, a chromium undercoat 2e was formed in a thickness of 15 nm on a polycarbonate substrate 1e by vacuum evaporation. A reflecting aluminum layer 3e was then formed in a thickness of 100 nm on the undercoat 2e by vacuum evaporation. Further, a protective aluminum oxide layer 4e was formed in a thickness of 20 nm on the reflecting layer 3e by vacuum evaporation. The fabricated surface reflector was evaluated for film adhesion to substrate and moisture resistance by the same method as used in Examples 1A-9A. The results are also shown in Table 3.

TABLE 3

| Example No. | Film arrangement on substrate | Time to peel, h |
| --- | --- | --- |
| Example | | |
| 1A | $Cr_2O_3/Al/Al_2O_3$ | $\geq 504$ |
| 2A | $MoO_2/Al/Al_2O_3$ | $\geq 504$ |
| 3A | $CoO/Al/Al_2O_3$ | $\geq 504$ |
| 4A | $Nb_2O_5/Al/Al_2O_3$ | $\geq 504$ |
| 5A | $CeO_2/Al/Al_2O_3$ | $\geq 504$ |
| 6A | $TiO_2/Al/Al_2O_3$ | $\geq 504$ |
| 7A | $Ta_2O_5/Al/Al_2O_3$ | 360 |
| 8A | $SiO_2/Al/Al_2O_3$ | 312 |
| 9A | $ZrO_2/Al/Al_2O_3$ | 264 |
| Comparative Example | | |
| 1A | $NiO/Al/Al_2O_3$ | 192 |
| 2A | $Al_2O_3/Al/Al_2O_3$ | 144 |
| 3A | $WO_3/Al/Al_2O_3$ | 72 |
| 4A | $Fe_2O_3/Al/Al_2O_3$ | 72 |
| 5A | $SiO/Al/Al_2O_3$ | 72 |
| 6A | $Cu_2O/Al/Al_2O_3$ | 72 |
| 7A | $SnO_2/Al/Al_2O_3$ | 24 |
| 8A | $Al/Al_2O_3$ | 72 |
| 9A | $Al/SiO_2$ | 48 |
| 10A | $Cr/Al/Al_2O_3$ | 72 |

In the surface reflector according to the first and second embodiments of the present invention, an oxide undercoat is formed between the substrate and the reflecting aluminum layer. This insures that even if the substrate is formed of plastics such as polycarbonates, polyesters or acrylic resins, the adhesion between the substrate and the reflecting layer is sufficiently enhanced to provide improved film adhesion to the substrate, moisture resistance and the like.

Figure 9:
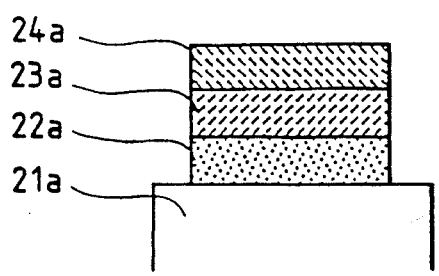
FIG. 9 is a sectional view showing a surface reflector according to a third embodiment of the present invention.

FIG. 9 shows schematically a surface reflector according to a third embodiment of the present invention. The surface reflector has a three-layer arrangement and the individual layers are formed by vacuum evaporation, sputtering or some other suitable techniques. The embodiment refers to the case where the surface reflector is formed on a substrate 21a formed of a plastic material such as a polycarbonate, polyester or acrylic resin, but needless to say, the reflector can also be formed on a glass substrate.

The substrate 21a is overlaid with a chromium sulfide undercoat 22a which in turn is overlaid successively with a reflecting layer 23a made of silver and a protective layer 24a.

The undercoat 22a is formed of chromium sulfide which has strong adhesion to both the reflecting layer made of silver and the substrate 21a made of the plastic materials listed above. The chromium sulfide undercoat 22a preferably has a thickness of at least 10 nm, with the range of 15-50 nm being particularly preferred. If the chromium sulfide undercoat 22a is thinner than 10 nm, no adequate adhesion to the substrate can be achieved.

The reflecting silver layer 23a which is formed over the chromium sulfide undercoat 22a preferably has a thickness of at least 45 nm, with the range of 100-200 nm being particularly preferred. If the reflecting layer 23a is thinner than 45 nm, total reflection will not occur and the resulting reflector will work as a half-mirror.

The protective layer 24a on the reflecting layer 23a is preferably formed of aluminum oxide and it preferably has a thickness of at least 20 nm, with the range of 20-100 nm being particularly preferred. If the protective layer 4a is thinner than 20 nm, the reflecting layer 23a cannot be fully protected.

Figure 10:
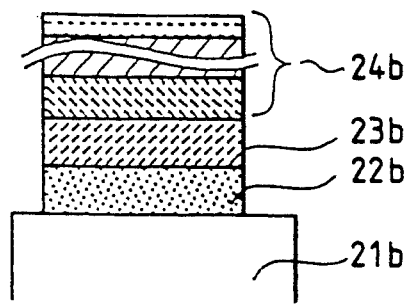
FIG. 10 is a sectional view showing a surface reflector according to a fourth embodiment of the present invention.

FIG. 10 shows schematically a surface reflector according to a fourth embodiment of the present invention. In this embodiment, the protective layer 24b is a multilayer film composed of an aluminum oxide layer and a layer of a transparent material but the other layers (undercoat 22b and reflecting layer 23b) are the same as in the embodiment shown in FIG. 9.

Exemplary transparent materials are dielectrics including zirconium oxide, tantalum oxide, titanium oxide, cerium oxide, niobium oxide, silicon dioxide and magnesium fluoride. The layer of such transparent materials preferably has a thickness of at least 20 nm, with the range of 20-100 nm being particularly preferred.

The aluminum oxide layer and the layer of a transparent material may be formed as single layers but if desired they may be superposed alternately to form a laminate. In the case of lamination, each layer may consist of 2-5 piles.

The following examples are provided for the purpose of further explaning the third and fourth embodiments of the present invention.

EXAMPLE 1B

To fabricate a surface reflector having the structure shown in FIG. 9, a chromium sulfide layer was formed in a thickness of 15 nm by vacuum evaporation on a polycarbonate substrate 21a so as to form a chromium sulfide undercoat 22a. A reflecting silver layer 23a was formed in a thickness of 100 nm on the chromium sulfide undercoat 22a by vacuum evaporation. Further, a protective aluminum oxide layer 24a was formed in a thickness of 100 nm on the reflecting layer 23a by vacuum evaporation.

The thus fabricated surface reflector was left to stand in a thermostatic chamber at 40° C. and at 95% r.h. until 216 h passed, a peel test was conducted using an adhesive tape at 24-h intervals in order to examine the film adhesion to substrate and moisture resistance of the sample. In consideration of actual use, the time to peel is desirably 200 h and longer. The test result is shown in Table 4.

Figure 11:
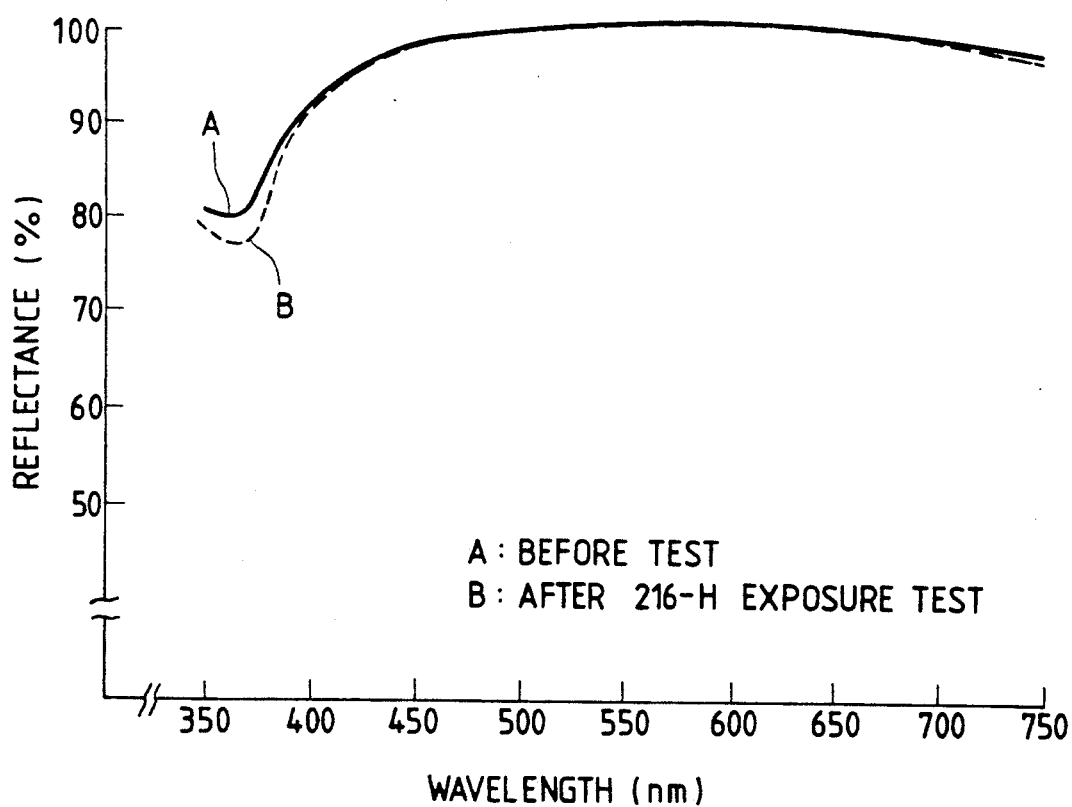
FIG. 11 is a graph showing two profiles of the spectral reflectance of 45° incident light by the surface reflector of Example 1B of the present invention, one profile (solid line A) being the initial and the other (dotted line B) being the data obtained after exposure to 40° C. and 95% r.h. for 216 h.

In Example 1B, the spectral reflectance of 45° incident light was measured before and after the 216-h exposure to the test conditions. The results are shown in FIG. 11, from which one can see that the surface reflector of the present invention experienced little change in the spectral reflectance of 45° incident light even when it was exposed to 40° C. at 95% r.h. for a prolonged time and that the reflectance after the 216-h exposure test was at least 97% in the visible range of 430-700 nm.

EXAMPLE 2B

To fabricate a surface reflector having the construction shown in FIG. 10, the procedure of Example 1B was repeated except that a multi-layered film of transparent material including an aluminum oxide layer was formed as the protective layer 24b. The protective layer 24b consisted of an aluminum oxide layer of 65 nm thickness and a dielectric zirconium oxide layer of 55 nm thickness. The fabricated surface reflector was subjected to peel tests as in Example 1B and similar results were obtained as regards the film adhesion to substrate and moisture resistance.

COMPARATIVE EXAMPLES 1B AND 2B

Surface reflectors were fabricated as in Example 1B except that the undercoat 22a was formed of zinc sulfide (Comparative Example 1B) or antimony sulfide (Comparative Example 2B) in place of chromium sulfide. The fabricated surface reflectors were evaluated for film adhesion to substrate and moisture resistance by the same method as used in Example 1B and the results are shown in Table 4.

COMPARATIVE EXAMPLE 3B

Figure 4:
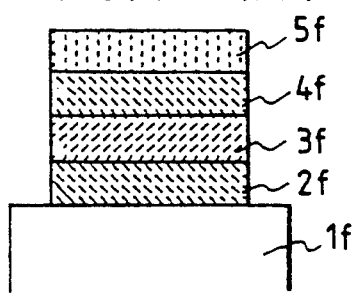

To fabricate a surface reflector having the four-layer arrangement shown in FIG. 4, an aluminum oxide undercoat 2f was formed in a thickness of 30 nm on a polycarbonate substrate 1f by vacuum evaporation. A reflecting silver layer 3f was then formed in a thickness of 100 nm on the undercoat 2f by vacuum evaporation. Further, an aluminum oxide layer 4f having a thickness of 30 nm and a silicon dioxide layer 5f having a thickness of 150 nm were successively formed as protective layers on the reflecting layer 3f by vacuum evaporation. The fabricated surface reflector was evaluated for film adhesion to substrate and moisture resistance by the same method as used in Example 1B. The result is also shown in Table 4.

COMPARATIVE EXAMPLE 4B

Figure 5:
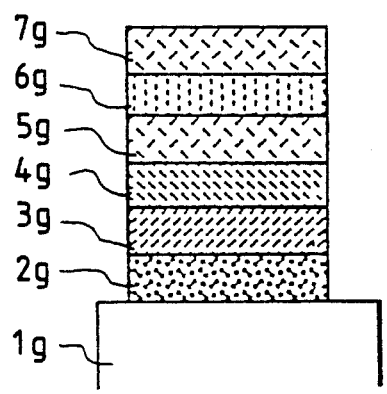

To fabricate a surface reflector having the structure shown in FIG. 5, a copper undercoat 2g was formed in a thickness of 40 nm on a polycarbonate substrate 1g by vacuum evaporation. A reflecting silver layer 3g was then formed in a thickness of 100 nm on the undercoat 2g by vacuum evaporation. Further, an aluminum oxide layer 4g having a thickness of 60 nm, a tantalum oxide layer 5g having a thickness of 75 nm, a silicon dioxide layer 6g having a thickness of 75 nm and a tantalum oxide layer 7g having a thickness of 75 nm were successively formed as protective layers on the reflecting layer 3g by vacuum evaporation. The fabricated surface reflector was evaluated for film adhesion to substrate and moisture resistance by the same method as used in Example 1B. The result is shown in Table 4.

TABLE 4

| Example No. | Time to peel, h |
| --- | --- |
| Example 1B | ≧216 |
| Comparative Example | |
| 1B | 72 |
| 2B | 72 |
| 3B | 24 |
| 4B | 48 |

In the surface reflector according to the third and the fourth embodiments of the present invention, the chromium sulfide undercoat is formed between the substrate and the reflecting silver layer. This insures that even if the substrate is formed of plastics such as polycarbonates, polyesters or acrylic resins, the adhesion between the substrate and the reflecting layer is sufficiently enhanced to provide improved film adhesion to the substrate, moisture resistance and the like.

Figure 12:
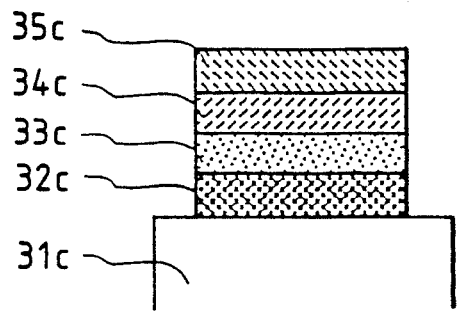
FIG. 12 is a sectional view showing a surface reflector according to a fifth embodiment of the present invention.

FIG. 12 shows schematically a surface reflector according to a fifth embodiment of the present invention. The surface reflector has a four-layer arrangement and the individual layers are formed by vacuum evaporation, sputtering or some other suitable techniques. The embodiment refers to the case where the surface reflector is formed on a substrate 31c formed of a plastic material such as a polycarbonate, polyester or acrylic resin but, needless to say, the reflector can also be formed on a glass substrate.

An undercoat 32c made of an oxide is formed on the substrate 31c; a sulfide undercoat 33c is formed on the oxide undercoat 32c; a reflecting silver layer 34c is formed on the sulfide undercoat 33c; and a protective layer 35c is formed on the reflecting layer 34c.

The oxide undercoat 32c is formed of an oxide that has strong adhesion to both the substrate 31c made of the plastic material mentioned above and the sulfide undercoat 33c. If the sulfide undercoat 33c is to be formed of zinc sulfide, the oxide is preferably selected from among aluminum oxide, niobium oxide, cobalt oxide and titanium oxide. If the sulfide undercoat 33c is to be formed of antimony sulfide, the oxide is preferably niobium oxide or cobalt oxide. The oxide undercoat 32c preferably has a thickness of at least 10 nm, with the range of 15-50 nm being particularly preferred. If the oxide undercoat 32c is thinner than 10 nm, no adequate adhesion can be achieved.

The sulfide undercoat 33c is formed of a sulfide that has strong adhesion to both the oxide undercoat 32c and the reflecting silver layer 34c. The preferred sulfide is zinc sulfide or antimony sulfide which are combined with the oxide undercoat 32c in an appropriate way as described above. The sulfide undercoat 33c preferably has a thickness of at least 10 nm, with the range of 15-50 nm being particularly preferred. If the sulfide undercoat 33c is thinner than 10 nm, no adequate adhesion can be achieved.

The reflecting silver layer 34c which is formed over the sulfide undercoat 33c preferably has a thickness of at least 45 nm, with the range of 100-200 nm being particularly preferred. If the reflecting layer 34c is thinner than 45 nm, total reflection will not occur and the resulting reflector will work as a half-mirror.

The protective layer 35c on the reflecting layer 34c is preferably formed of aluminum oxide and it preferably has a thickness of at least 20 nm, with the range of 20-100 nm being particularly preferred. If the protective layer 35c is thinner than 20 nm, the reflecting layer 34c cannot be fully protected.

Figure 13:
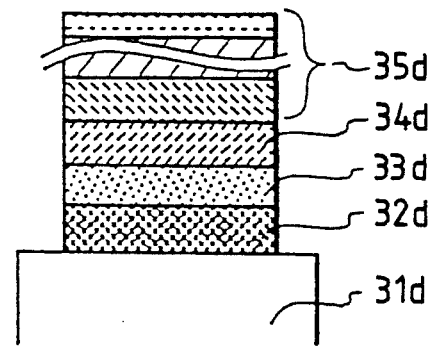
FIG. 13 is a sectional view showing a surface reflector according to a sixth embodiment of the present invention.

FIG. 13 shows schematically a surface reflector according to a sixth embodiment of the present invention. In this embodiment, the protective layer 35d is a multilayer film composed of at least one aluminum oxide layer and at least one transparent material layer, but the other layers (oxide undercoat 32d, sulfide undercoat 33d and reflecting layer 34d) are the same as in the embodiment shown in FIG. 12.

Exemplary transparent materials are dielectrics including zirconium oxide, tantalum oxide, titanium oxide, cerium oxide, niobium oxide, silicon dioxide and magnesium fluoride. The layer of such transparent materials preferably has a thickness of at least 20 nm, with the range of 20-100 nm being particularly preferred.

The protective layer may be formed of one aluminum oxide layer and one transparent material layer, but preferably it is formed of 2-5 layers of aluminum oxide and a transparent material superposed alternately.

The following examples are provided for the purpose of further explaining the fifth and sixth embodiments of the present invention.

EXAMPLES 1C-6C

To fabricate surface reflectors having the structure shown in FIG. 12, the layers of oxides (see Table 5) were formed in a thickness of 15 nm by vacuum evaporation on a polycarbonate substrate 31c so as to form an oxide undercoat 32c. A sulfide layer that complied with the oxide-sulfide combinations shown in Table 5 below was formed in thickness of 15 nm on the oxide undercoat 32c by vacuum evaporation to form a sulfide undercoat 33c. A reflecting silver layer 34c was formed in a thickness of 100 nm on the sulfide undercoat 33c by vacuum evaporation. Further, a protective aluminum oxide layer 35c was formed in a thickness of 100 nm on the reflecting layer 34c by vacuum evaporation.

TABLE 5

| Example No. | Oxide in undercoat 32c | Sulfide in undercoat 33c |
|---|---|---|
| 1C | aluminum oxide | zinc sulfide |
| 2C | niobium oxide | zinc sulfide |
| 3C | cobalt oxide | zinc sulfide |
| 4C | titanium oxide | zinc sulfide |
| 5C | niobium oxide | antimony sulfide |
| 6C | cobalt oxide | antimony sulfide |

The thus fabricated surface reflector were left to stand in a thermostatic chamber at 40° C. and at 95% r.h. Until 216 h passed, a peel test was conducted using an adhesive tape at 24-h intervals in order to examine the film adhesion to substrate and moisture resistance of the sample. In consideration of actual use, the time to peel is desirably 200 h and longer. The test result are shown in Table 7.

Figure 15:
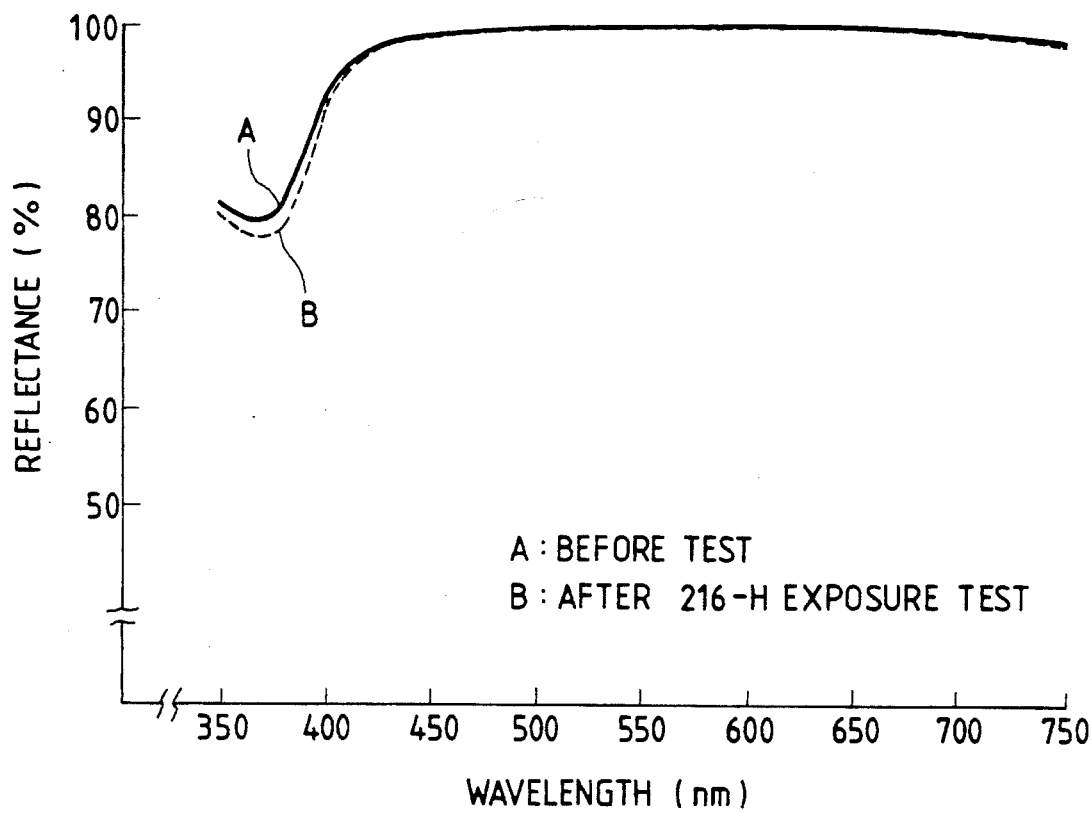
FIG. 15 is a graph showing two profiles of the spectral reflectance of 45° incident light by the surface reflector of Example 1c of the present invention, one profile (solid line A) being the initial and the other (dotted line B) being the data obtained after exposure to 40° C. and 95% r.h. for 216 h.

In Example 1C, the spectral reflectance of 45° incident light was measured before and after the 216-h exposure to the test conditions. The results are shown in FIG. 15, from which one can see that the surface reflector of the present invention experienced little change in the spectral reflectance of 45° incident light even when it was exposed to 40° C. at 95% r.h. for a prolonged time and that the reflectance after the 216-h exposure test was at least 97% in the visible range of 430-700 nm.

EXAMPLE 7C

To fabricate a surface reflector having the construction shown in FIG. 13, the procedure of Examples 1C-6C was repeated except that a multi-layered film of transparent material including an aluminum oxide layer was formed as protective layer 35d. The protective layer 35d consisted of an aluminum oxide layer of 65 nm thickness and a dielectric zirconium oxide layer of 55 nm thickness. The fabricated surface reflector was subjected to peel tests as in Examples 1C-6C and similar results were obtained as regards the film adhesion to substrate and moisture resistance.

COMPARATIVE EXAMPLES 1C-8C

Surface reflectors were fabricated as in Examples 1C-6C except that the oxide and sulfide undercoats were formed in accordance with the oxide-sulfide combinations shown in Table 6 below. The fabricated surface reflectors were evaluated for film adhesion to substrate and moisture resistance by the same method as used in Examples 1C-6C and the results are shown in Table 7.

TABLE 6

| Comparative Example No. | Oxide in undercoat 32c | Sulfide in undercoat 33c |
|---|---|---|
| 1C | chromium oxide | zinc sulfide |
| 2C | molybdenum oxide | zinc sulfide |
| 3C | cerium oxide | zinc sulfide |
| 4C | aluminum oxide | antimony sulfide |
| 5C | titanium oxide | antimony sulfide |
| 6C | chromium oxide | antimony sulfide |
| 7C | molybdenum oxide | antimony sulfide |
| 8C | cerium oxide | antimony sulfide |

COMPARATIVE EXAMPLES 9C AND 10C

Figure 14:
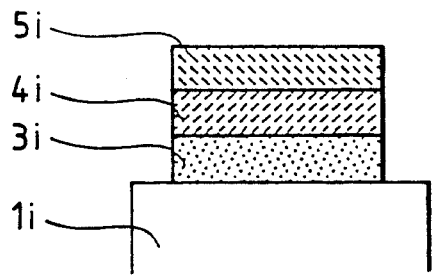
FIG. 14 is a sectional view showing a surface reflector of Comparative Examples 11C-12C.

To fabricate surface reflectors having the three-layer arrangement shown in FIG. 14, a zinc sulfide layer (Comparative Example 9C) or an antimony sulfide layer (Comparative Example 10C) was formed in a thickness of 15 nm on a polycarbonate substrate 1i by vacuum evaporation to form a sulfide undercoat 3i. A reflecting silver layer 4i was then formed in a thickness of 100 nm on the sulfide undercoat 3i by vacuum evaporation. Further, a protective aluminum oxide layer 5i was formed in a thickness of 100 nm on the reflecting layer 4i by vacuum evaporation. The fabricated surface reflectors were evaluated for film adhesion to substrate and moisture resistance by the same method as used in Examples 1C-6C. The results are shown in Table 7.

TABLE 7

| Example No. | Time to peel, h |
|---|---|
| Example | |
| 1C | ≧216 |
| 2C | ≧216 |
| 3C | ≧216 |
| 4C | ≧216 |
| 5C | ≧216 |
| 6C | ≧216 |
| Comparative Example | |
| 1C | 72 |
| 2C | 24 |
| 3C | 72 |
| 4C | 144 |
| 5C | 48 |
| 6C | 48 |
| 7C | 48 |
| 8C | 24 |
| 9C | 72 |
| 10C | 72 |

As Table 7 shows, the oxide undercoat in the surface reflector of the present invention exhibits particularly strong film adhesion to the substrate and the zinc sulfide undercoat if it is made of at least one material selected from among aluminum oxide, niobium oxide, cobalt oxide and titanium oxide. Table 7 also shows that the oxide undercoat exhibits particularly strong film adhesion to the substrate and the antimony sulfide undercoat if it is made of either niobium oxide or cobalt oxide or both.

In the surface reflector according to the fifth and sixth embodiments of the present invention, the oxide undercoat and the sulfide undercoat are formed successively between the substrate and the reflecting silver layer. This insures that even if the substrate is formed of plastics such as polycarbonates, polyesters or acrylic resins, the adhesion between the substrate and the reflecting layer is sufficiently enhanced to provide improved film adhesion to the substrate, moisture resistance and the like.

Figure 16:
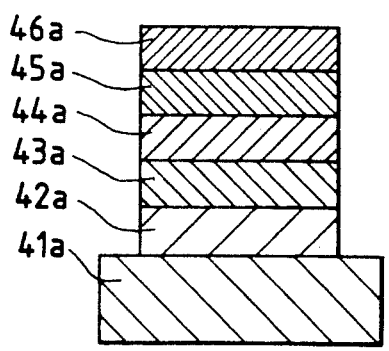
FIG. 16 is a sectional view showing a surface reflector according to a seventh embodiment of the present invention.

FIG. 16 shows schematically a surface reflector according to a seventh embodiment of the present invention. The surface reflector has a five-layer arrangement and the individual layers are formed by vacuum evaporation, sputtering or some other suitable techniques. The embodiment refers to the case where the surface reflector is formed on a substrate 41a formed of a plastic material such as a polycarbonate or acrylic resin but, needless to say, the reflector can also be formed on a glass substrate.

The substrate 41a is overlaid with a chromium sulfide undercoat 42a which in turn is overlaid successively with a reflecting layer 43a made of silver, a protective layer (I) 44a, and protective layers (II) 45a and 46a.

The undercoat 42a is formed of chromium sulfide which has strong adhesion to both the reflecting layer made of silver and the substrate 42a made of the plastic materials listed above. The chromium sulfide undercoat 42a has a thickness of at least 10 nm, with the range of 15-35 nm being particularly preferred. If the chromium sulfide undercoat 42a is thinner than 10 nm, no adequate adhesion to the substrate can be achieved.

The reflecting silver layer 43a which is formed over the chromium sulfide undercoat 42a preferably has a thickness of at least 45 nm, with the range of 100-200 nm being particularly preferred. If the reflecting layer 43a is thinner than 45 nm, total reflection will not occur and the resulting reflector will work as a half-mirror.

The protective layer (I) 44a on the reflecting silver layer 43a is formed of chromium sulfide in order to prevent sulfide ions from entering the reflecting layer 43a. The protective layer (I) 44a preferably has a thickness of 1-10 nm, with the range of 2-5 nm being particularly preferred. If the protective layer (I) 44a is thicker than 11 nm, chromium sulfide which absorbs light will cause unwanted drop in reflectance over the entire visible range.

In the embodiment under consideration, enhanced reflection is added in the wavelength range of 400-450 nm in order to produce a neutral reflection color by reducing reflectance drop that can occur in the surface reflector at shorter wavelengths on account of light absorption by the chromium sulfide of which the protective layer (I) 44a is formed. To this end, the protective layer (II) on the protective layer (I) 44a is preferably formed of an aluminum oxide layer 45a (refractive index $n=1.63$) and a zirconium oxide layer 46a ($n=1.95$). The aluminum oxide layer 45a preferably has a thickness of 45-90 nm, with the range of 60-70 nm being particularly preferred. The zirconium oxide layer 46a preferably has a thickness of 40-70 nm, with the range of 50-60 nm being particularly preferred.

The above-described embodiment is not the sole case for attaining the aforementioned effect of the protective layer (II). Another preferred embodiment is such that one of at least two layers of which the protective layer (II) is composed is made of aluminum oxide while the other is made of a different protective material, one of the two layers, which is the closer to the substrate, having a lower refractive index than the other layer. Examples of materials combinations that satisfy these requirements include not only aluminum oxide plus zirconium oxide but also aluminum oxide plus titanium oxide, as well as silicon dioxide plus aluminum oxide.

The following examples are provided for the purpose of further explaining the seventh embodiments of the present invention.

EXAMPLE 1D

To fabricate a surface reflector having the structure shown in FIG. 16, a chromium sulfide layer was formed in a thickness of 15 nm by vacuum evaporation on a polycarbonate substrate 41a so as to form a chromium sulfide undercoat 42a. A reflecting silver layer 43a was formed in a thickness of 100 nm on the chromium sulfide undercoat 42a by vacuum evaporation. A protective chromium sulfide layer (I) 44a was formed in a thickness of 3 nm on the reflecting layer 43a by vacuum evaporation. Further, an aluminum oxide layer 45a having a thickness of 66 nm and a zirconium oxide layer 46a having a thickness of 55 nm were successively formed as protective layers (II) on the protective layer (I) 44a by vacuum evaporation.

COMPARATIVE EXAMPLE 1D

Figure 17:
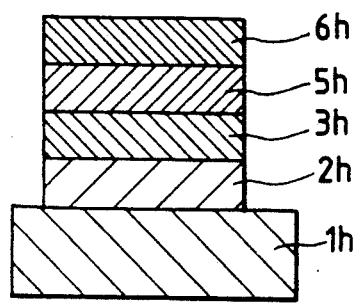
FIG. 17 is a sectional view showing a surface reflector fabricated in Comparative Example 1D.

To fabricate a surface reflector having the structure shown in FIG. 17, chromium sulfide layer was formed in a thickness of 15 nm by vacuum evaporation on a polycarbonate substrate 1h so as to form a chromium sulfide undercoat 2h. A reflecting silver layer 3h was formed in a thickness of 100 nm on the chromium sulfide undercoat 2h by vacuum evaporation. Further, an aluminum oxide layer 5h having a thickness of 66 nm and a zirconium oxide layer 6h having a thickness of 55 nm were successively formed as protective layers on the reflecting layer 3h by vacuum evaporation.

COMPARATIVE EXAMPLE 2D

To fabricate a surface reflector having the four-layer arrangement shown in FIG. 4, an aluminum oxide undercoat 2f was formed in a thickness of 30 nm on a polycarbonate substrate 1f by vacuum evaporation. A reflecting silver layer 3f was then formed in a thickness of 100 nm on the undercoat 2f by vacuum evaporation. Further, an aluminum oxide layer 4f having a thickness of 30 nm and a silicon dioxide layer 5f having a thickness of 100 nm were successively formed as protective layers on the reflecting layer 3f by vacuum evaporation.

COMPARATIVE EXAMPLE 3D

To fabricate a surface reflector having the structure shown in FIG. 5, a copper undercoat 2g was formed in a thickness of 40 nm on a polycarbonate substrate 1g by vacuum evaporation. A reflecting silver layer 3g was then formed in a thickness of 100 nm on the undercoat 2g by vacuum evaporation. Further, an aluminum oxide layer 4g having a thickness of 60 nm, a tantalum oxide layer 5g having a thickness of 75 nm, a silicon dioxide layer 6g having a thickness of 60 nm and a tantalum oxide layer 7g having a thickness of 75 nm were successively formed as protective layers on the reflecting layer 3g by vacuum evaporation.

The surface reflectors fabricated in Example 1D and Comparative Examples 1D-3D were left to stand in a thermostatic chamber at 40° C. and at 95% r.h. Until 216 h passed, a peel test was conducted at 24-h intervals in order to examine the film adhesion to substrate and moisture resistance of each sample. In consideration of actual use, the time to peel is desirably 200 h and longer. The test results are shown in Table 8 below.

TABLE 8

| Example No. | Time to peel, h |
| --- | --- |
| Example 1D | ≧216 |
| Comparative Example | |
| 1D | ≧216 |
| 2D | 24 |
| 3D | 48 |

Figure 18:
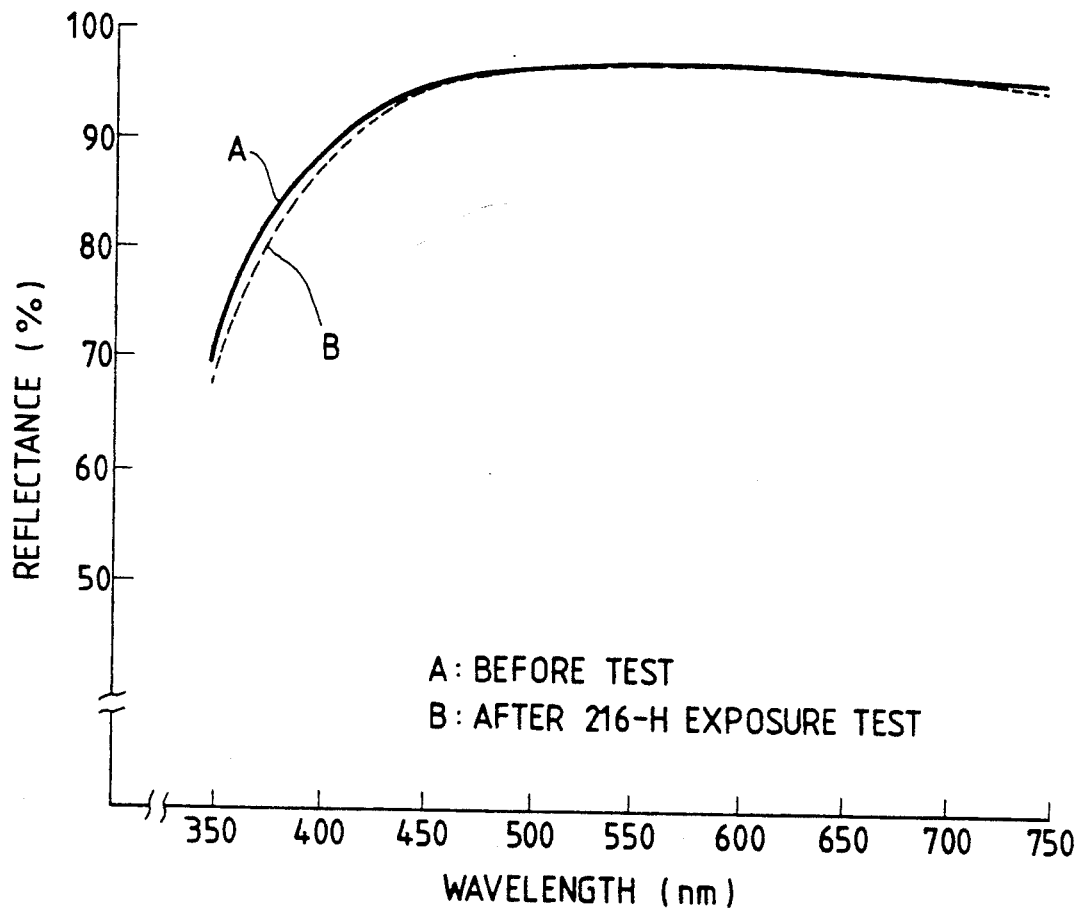
FIG. 18 is a graph showing two profiles of the spectral reflectance of 45° incident light by the surface reflector of Example 1D of the present invention, one profile (solid line A) being the initial and the other (dotted line B) being the data obtained after exposure to 40° C. and 95% r.h. for 216 h.

In Example 1D, the spectral reflectance of 45° incident light was measured before and after the 216-h exposure to the test conditions. The results are shown in FIG. 18, from which one can see that the surface reflector of Example 1D experienced little change in the spectral reflectance of 45° incident light even when it was exposed to 40° C. and 95% r.h. for a prolonged time and that the reflectance after the 216-h exposure test was at least 92% in the visible range of 430–700 nm and at least 94% in the range of 450–700 nm. Further, the change in reflectance in the visible range of 430–700 nm was satisfactorily small (1%).

The CIE chromaticity coordinates (CIE is the acronym for Commission Internationale de l'Éclairage or the International Commission on Illumination) as determined from data in FIG. 18 were x=0.3350 and y=0.3368, with the dominant wavelength, excitation purity and luminous reflectance being 569.7 nm, 1.56% and 97%, respectively. Since the excitation purity was 1.56%, it can safely be concluded that the surface reflector of Example 1D successfully produced a substantially neutral reflection color.

The surface reflectors of Example 1D and Comparative Example 1D were placed 100 mm above the liquid level of a 10% aqueous solution of $(NH_4)_2S$ and a sulfur resistance test was conducted to investigate any changes in the surface state of each reflector and the reflectance at 400 nm after the elapse of 4h. The results are shown in Table 9 below.

TABLE 9

| | Surface change after sulfur resistance test | |
| --- | --- | --- |
| Example No. | Surface state | Change of reflectance at 400 nm |
| Example 1D | no change | 0% |
| Comparative Example 1D | Interference color change | −2% |

The data shows that in Example 1D where the reflecting silver layer was overlaid with the protective chromium sulfide layer (I) which in turn was overlaid with the protective layer (II) composed of aluminum oxide and zirconium oxide, no change occurred in the surface state or reflectance at 400 nm upon exposure to sulfide ions, whereas in Comparative Example 1D where the protective layer composed of aluminum oxide and zirconium oxide was formed directly on the reflecting silver layer, the surface state changed and the reflectance at 400 nm also dropped upon exposure to sulfide ions. It is therefore clear that the high-reflectance surface reflector of Example 1D which is within the scope of the present invention has strong sulfur resistance.

In the surface reflector according to the seventh embodiment of the present invention, the chromium sulfide undercoat is formed between the substrate and the reflecting silver layer and at the same time the protective chromium sulfide layer (I) is formed on the reflecting layer. This is effective not only in enhancing the adhesion between the substrate and the reflecting layer made of silver but also in preventing the ingress of sulfide ions into the reflecting layer. As a result, the surface reflector of the present invention exhibits high film adhesion to substrate, moisture resistance, sulfur resistance and the like even if the substrate is formed of plastics such as polycarbonates or acrylic resins.

Figure 19:
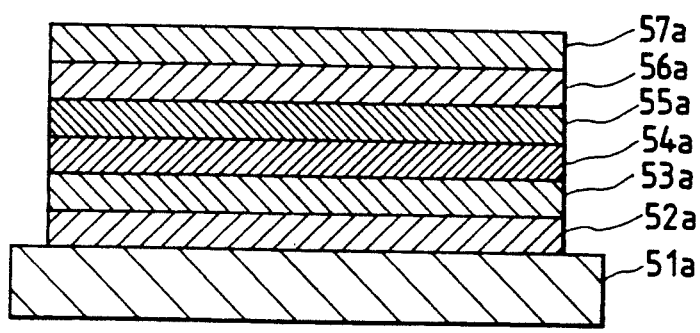
FIG. 19 is a sectional view showing a surface reflector according to eighth, ninth or tenth embodiment of the present invention.

FIG. 19 shows schematically a surface reflector having layer arrangement according to eighth, ninth or tenth embodiment of the present invention. The surface reflector has a six-layer arrangement and the individual layers are formed by vacuum evaporation, sputtering or some other suitable techniques. The embodiment refers to the case where the surface reflector is formed on a substrate 51a formed of a plastic material such as a polycarbonate or acrylic resin but, needless to say, the reflector can also be formed on a glass substrate.

The substrate 51a is overlaid with a chromium sulfide undercoat 52a which in turn is overlaid successively with a reflecting layer 53a made of silver, a protective layer (I) 54a, and protective layers (II) 55a and 56a, as well as a protective layer (III) 57a.

The undercoat 52a is formed of chromium sulfide which has strong adhesion to both the reflecting layer made of silver and the substrate made of the plastic materials listed above. The chromium sulfide undercoat 52a has a thickness of at least 10 nm, with the range of 15–35 nm being particularly preferred. If the chromium sulfide undercoat 52a is thinner than 10 nm, no adequate adhesion to the substrate can be achieved.

The reflecting silver layer 53a which is formed over the chromium sulfide undercoat 52a preferably has a thickness of at least 45 nm, with the range of 100–200 nm being particularly preferred. If the reflecting layer 53a is thinner than 45 nm, total reflection will not occur and the resulting reflector will work as a half-mirror.

The protective layer (I) 54a on the reflecting silver layer 53a is formed of chromium sulfide in order to prevent sulfide ions from entering the reflecting layer 53a. The protective layer (I) 54a preferably has a thickness of 1–10 nm, with the range of 2–5 nm being particularly preferred. If the protective layer (I) 54a is thicker than 10 nm, chromium sulfide which absorbs light will cause unwanted drop in reflectance over the entire visible range.

The protective layer (II) on the protective layer (I) 54a is formed of a multi-layered film of a transparent material at least including an aluminum oxide in order to prevent the ingress of moisture. According to the eighth embodiment, the protective layer (II) is composed of an aluminum oxide layer 55a and a zirconium oxide layer 56a. The zirconium oxide layer 56a serves to produce a neutral reflection color by reducing reflectance drop that can occur in the surface reflector at shorter wavelengths on account of light absorption by the chromium sulfide of which the protective layer (I) 54a is formed. To this end, the zirconium oxide layer 56a increases the reflectance in the wavelength range of 350–450 nm. For this purpose, the protective layer (II) 55a formed of aluminum oxide (refractive index n=1.63) preferably has a thickness of 45–80 nm, with the range of 50–65 nm being particularly preferred. Further, the protective layer (II) 56a formed of zirconium oxide (n=1.95) preferably has a thickness of 20–60 nm, with the range of 25–45 nm being particularly preferred.

The protective layer (III) 57a on the protective layers (II) 55a and 56a is formed of silicon dioxide in order to provide enhanced abrasion resistance. The protective layer (III) 57a preferably has a thickness of 7-23 nm, with the range of 10-20nm being particularly preferred. If the protective layer (III) 57a is thinner than 7 nm, no adequate abrasion resistance can be achieved. If the protective layer (III) 57a is thicker than 23 nm, the ability of the protective layers (II) 55a and 56a to provide enhanced reflection is impaired.

According to the ninth embodiment, the layer 55a of the two protective layers (II), which is the closer to the substrate, is formed of aluminum oxide (n=1.63) whereas the outer layer 56a is formed of titanium oxide (n=2.23). In this case, the aluminum oxide film preferably has a thickness of 45-80 nm, with the range of 50-65 nm being particularly preferred. The titanium oxide film preferably has a thickness of 20-60 nm, with the range of 25-40 nm being particularly preferred.

According to the tenth embodiment, the layer 55a of the two protective layers (II), which is the closer to the substrate, is formed of silicon dioxide (n=1.43) whereas the outer layer 56a is formed of aluminum oxide (n=1.63). In this case, the silicon dioxide film preferably has a thickness of 45-80 nm, with the range of 55-75 nm being particularly preferred. The aluminum oxide film preferably has a thickness of 20-60 nm, with the range of 35-55 nm being particularly preferred.

The following examples are provided for the propose of further explaining the present invention.

EXAMPLE 1F

To fabricate a surface reflector having the structure shown in FIG. 19, a chromium sulfide layer was formed in a thickness of 15 nm by vacuum evaporation on a polycarbonate substrate 51a so as to form a chromium sulfide undercoat 52a. A reflecting silver layer 53a was formed in a thickness of 100 nm on the chromium sulfide undercoat 52a by vacuum evaporation. A protective chromium sulfide layer (I) 54a was formed in a thickness of 3 nm on the reflecting layer 53a by vacuum evaporation. Over the protective layer (I) 54a, an aluminum oxide layer 55a and a zirconium oxide layer 56a were successively formed in respective thicknesses of 54 nm and 36 nm by vacuum evaporation. Further, a silicon dioxide layer was formed as a protective layer (III) 57a in a thickness of 15 nm by vacuum evaporation.

EXAMPLE 2F

To fabricate a surface reflector having the structure shown in FIG. 19, a chromium sulfide layer was formed in a thickness of 15 nm by vacuum evaporation on a polycarbonate substrate 51a so as to form a chromium sulfide undercoat 52a. A reflecting silver layer 53a was formed in a thickness of 100 nm on the chromium sulfide undercoat 52a by vacuum evaporation. A protective chromium sulfide layer (I) 54a was formed in a thickness of 3 nm on the reflecting layer 53a by vacuum evaporation. Over the protective layer (I) 54a, an aluminum oxide layer 55a and a titanium oxide layer 56a were successively formed in respective thicknesses of 54 nm and 31 nm by vacuum evaporation. Further, a silicon dioxide layer was formed as a protective layer (III) 57a in a thickness of 15 nm by vacuum evaporation.

EXAMPLE 3F

To fabricate a surface reflector having the structure shown in FIG. 19, a chromium sulfide layer was formed in a thickness of 15 nm by vacuum evaporation on a polycarbonate substrate 51a so as to form a chromium sulfide undercoat 52a. A reflecting silver layer 53a was formed in a thickness of 100 nm on the chromium sulfide undercoat 52a by vacuum evaporation. A protective chromium sulfide layer (I) 54a was formed in a thickness of 3 nm on the reflecting layer 53a by vacuum evaporation. Over the protective layer (I) 54a, a silicon oxide layer 55a and a aluminum oxide layer 56a were successively formed in respective thicknesses of 62 nm and 44 nm by vacuum evaporation. Further, a silicon dioxide layer was formed as a protective layer (III) 57a in a thickness of 15 nm by vacuum evaporation.

COMPARATIVE EXAMPLE 1F

A surface reflector of this Comparative Example 1F was identical to that of Example 1D except that the thickness of the aluminum oxide layer 45a was 54 nm and the thickness of the zirconium oxide layer 46a was 51 nm.

COMPARATIVE EXAMPLE 2F

A surface reflector of this Comparative Example 2F was identical to that of Example 1D except that the layer 45a was an aluminum oxide layer having a thickness of 54 nm and the layer 46a was a titanium oxide layer having a thickness of 46 nm.

COMPARATIVE EXAMPLE 3F

A surface reflector of Comparative Example 3F is identical to that of Example 1D except that the layer 45a was a silicon dioxide layer having a thickness of 62 nm and the layer 46a was an aluminum oxide layer having a thickness of 59 nm.

The surface reflectors fabricated in Examples 1F-3F and Comparative Examples 1F-3F were in no way different in terms of film adhesion to the substrate, moisture resistance, sulfur resistance and the like. This is obviously due to the combined effect of the chromium sulfide undercoat, protective chromium sulfide layer (I) and the aluminum oxide film in the protective layer (II) although test results demonstrating this effect are omitted.

However, those reflectors differed as regards the abrasion resistance of their surface. The abrasion resistance of the surface reflectors fabricated in Examples 1F-3F and Comparative Examples 1F-3F was evaluated by examining their surface after it was rubbed with lens cleaning paper back and forth through 20 cycles. The results are shown in Table 10 below.

TABLE 10

| Example No. | Albrasion resistance |
|---|---|
| Example | |
| 1F | ⊚ |
| 2F | ⊚ |
| 3F | ⊚ |
| Comparative Example | |
| 1F | X |
| 2F | Δ |

TABLE 10-continued

| Example No. | Albrasion resistance |
|---|---|
| 3F | Δ |

⊙: no surface flaw
Δ: small surface flaws
X: extensive surface flaws

According to Table 10, the surface reflectors according to the eighth, ninth and tenth embodiments of the present invention (Examples 1F-3F) had high abrasion resistance.

Figure 20:
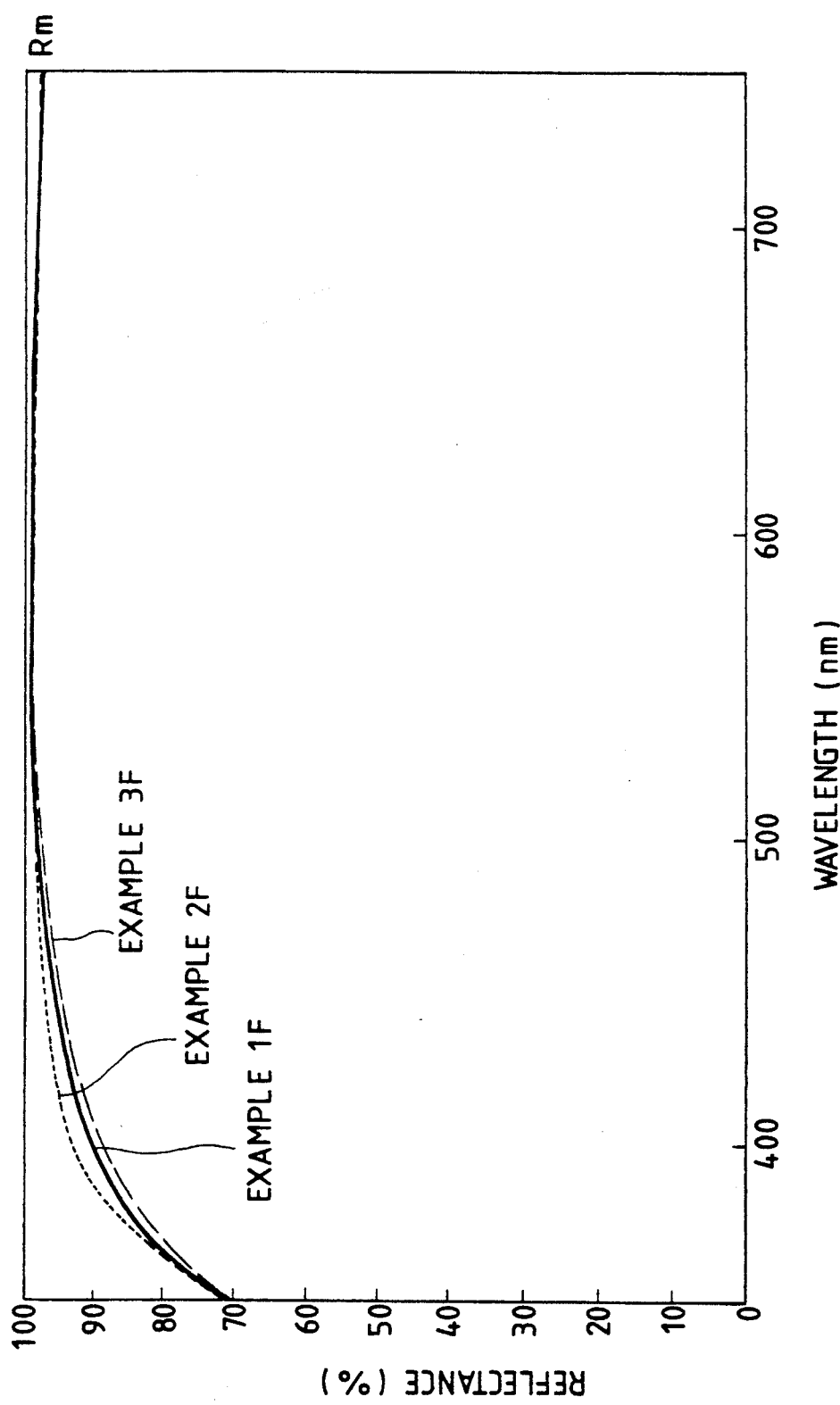
FIG. 20 is a graph showing the spectral reflectance of 5° incident light by the surface reflector fabricated in Example 1F-3F.

Next, the spectral reflectance of the surface reflectors of the eighth, ninth and tenth embodiments of the present invention was measured in order to evaluate their reflection color. FIG. 20 shows the spectral reflectance of 5° incident light by each of the surface reflectors fabricated in Examples 1F-3F. Further, CIE chromaticity coordinates x and y, dominant wavelengths, excitation purities and luminous reflectances were determined from the data shown in FIG. 20 and the results are shown in Table 11 below.

TABLE 11

| Example No. | CIE chromaticity coordinate x | CIE chromaticity coordinate y | Dominant wavelength (nm) | Excitation purity (%) | Luminous reflectance (%) |
|---|---|---|---|---|---|
| 1F | 0.3353 | 0.3361 | 573.8 | 1.46 | 97.0 |
| 2F | 0.3346 | 0.3354 | 572.7 | 1.02 | 97.6 |
| 3F | 0.3360 | 0.3369 | 574.5 | 1.87 | 96.8 |

As Table 11 shows, the surface reflectors of the present invention (Examples 1F-3F) had luminous reflectances of at least 96.8% and excitation purities no higher than 1.87%, so it can safely be concluded that those reflectors had high reflectance and successfully produced a substantially neutral reflection color.

In the surface reflector according to the eighth, ninth or tenth embodiment of the present invention, the chromium sulfide undercoat is formed between the substrate and the reflecting silver layer, which in turn is overlaid with the protective layer (I) which in turn is overlaid with the protective layer (II) including at least an aluminum oxide layer, with the protective layer (III) being formed of silicon dioxide on the outermost surface. This layer arrangement enhances the adhesion between the substrate and the reflecting silver layer, prevents both sulfide ions and moisture from entering the reflecting layer and imparts improved abrasion resistance to the surface of the reflector.

As a result, the surface reflector of the present invention exhibits high film adhesion to substrate, moisture resistance, sulfur resistance, abrasion resistance and the like even if the substrate is formed of plastics such as polycarbonates or acrylic resins.

The foregoing discussion of the embodiments 1 to 10 assumes that a reflector is formed on a plastic substrate but it should be noted that the advantages of the present invention are also attained effectively even when the reflector is formed on a glass substrate.

The present disclosure relates to subject matter contained in Japanes patent application Nos. 2-35809 filed Feb. 16, 1990, 2-35810 filed Feb. 16, 1990, 2-35811 filed Feb. 16, 1990, 2-73622 filed Mar. 23, 1990 and 2-317099 filed Nov. 21, 1990, which are expressly incorporated herein by reference in their entirety.

What is claimed is:

1. A surface reflector, comprising:

(a) a chromium sulfide undercoat formed on a surface of a substrate;
(b) a reflecting silver layer formed over said chromium sulfide undercoat; and
(c) a protective layer formed over said reflecting layer.

2. A surface reflector according to claim 1, wherein said chromium sulfide undercoat has a thickness of at least 10 nm.

3. A surface reflector as claimed in claim 1, wherein said protective layer includes a protective layer (I) made of chromium sulfide that is formed over said reflecting silver layer, and a protective layer (II) formed over said protective layer (I).

4. A surface reflector as claimed in claim 3, wherein said protective layer (II) includes at least one aluminum oxide layer.

5. A surface reflector according to claim 4, wherein said protective layer (II) is formed of a multi-layered film of a transparent material which at least has an aluminum oxide layer and a zirconium oxide layer.

6. A surface reflector according to claim 5, wherein said chromium sulfide undercoat has a thickness of at least 10 nm, said reflecting silver layer has a thickness of at least 45 nm, said protective chromium sulfide layer (I) has a thickness of 1-10 nm, and said protective layer (II) is formed of an aluminum oxide layer having a thickness of 45-90 nm and a zirconium oxide layer having a thickness of 40-70 nm.

7. A surface reflector according to claim 3, further comprising a protective silicon dioxide layer (III) formed over said protective layer (II), wherein said protective layer (II) includes at least an aluminum oxide layer.

8. A surface reflector according to claim 7, wherein said protective layer (II) is formed of a multi-layered film of a transparent material which has an aluminum oxide layer and a zirconium oxide layer formed on said aluminum oxide layer.

9. A surface reflector according to claim 8, wherein said chromium sulfide undercoat has a thickness of at least 10 nm, said reflecting silver layer has a thickness of at least 45 nm, said protective chromium sulfide layer (I) has a thickness of 1-10 nm, said protective layer (II) is formed of an aluminum oxide layer having a thickness of 45-80 nm and a zirconium oxide layer having a thickness of 20-60 nm, and said protective silicon dioxide layer (III) has a thickness of 7-23 nm.

10. A surface reflector according to claim 7, wherein said protective layer (II) is formed of a multi-layered film of a transparent material which has an aluminum oxide layer and a titanium oxide layer formed on said aluminum oxide layer.

11. A surface reflector according to claim 10, wherein said chromium sulfide undercoat has a thickness of at least 10 nm, said reflecting silver layer has a thickness of at least 45 nm, said protective chromium sulfide layer (I) has a thickness of 1-10 nm, said protective layer (II) is formed of an aluminum oxide layer having a thickness of 45-80 nm and a titanium oxide layer having a thickness of 20-60 nm, and said protective silicon dioxide layer (III) has a thickness of 7-23 nm.

12. A surface reflector according to claim 7, wherein said protective layer (II) is formed of a multi-layered film of a transparent material which has a silicon dioxide layer and an aluminum oxide layer formed on said silicon dioxide layer.

13. A surface reflector according to claim 12, wherein said chromium sulfide undercoat has a thickness of at least 10 nm, said reflecting silver layer has a thickness of at least 45 nm, said protective chromium sulfide layer has a thickness of 1-10 nm, said protective layer (II) is formed of an silicon dioxide layer having a thickness of 45-80 nm and an aluminum oxide layer having a thickness of 20-60 nm, and said protective silicon dioxide layer (III) has a thickness of 7-23 nm.

14. A surface reflector as claimed in claim 1, wherein said substrate is formed of plastics.

15. A surface reflector, comprising:
(a) an oxide undercoat formed on the surface of a substrate, said oxide undercoat being made of at least one material selected from the group consisting of chromium oxide, molybdenum oxide, cobalt oxide, niobium oxide and cerium oxide;
(b) a reflecting aluminum layer formed over said oxide undercoat; and
(c) a protective layer formed over said reflecting layer.

16. A surface reflector as claimed in claim 15, wherein said protective layer includes at least one aluminum oxide layer.

17. A surface reflector as claimed in claim 15, wherein said substrate is formed of plastics.

18. A surface reflector, comprising:
(a) an oxide undercoat formed on the surface of a substrate, said oxide undercoat being made of at least one material selected from the group consisting of niobium oxide, cobalt oxide, and titanium oxide;
(b) a sulfide undercoat formed over said oxide undercoat, said sulfide undercoat being made of zinc sulfide;
(c) a reflecting silver layer formed over said sulfide undercoat; and
(d) a protective layer formed over said reflecting layer.

19. A surface reflector as claimed in claim 18, wherein said protective layer includes at least one aluminum oxide layer.

20. A surface reflector as claimed in claim 18, wherein said substrate is formed of plastics.

21. A surface reflector, comprising:
(a) an oxide undercoat formed on a surface of a substrate, said oxide undercoat being made of either niobium oxide or cobalt oxide or both;
(b) a sulfide undercoat formed over said oxide undercoat, said sulfide undercoat being made of antimony sulfide;
(c) a reflecting silver layer formed over said sulfide undercoat; and
(d) a protective layer formed over said reflecting layer.

22. A surface reflector as claimed in claim 21, wherein said substrate is formed of plastics.

23. A surface reflector as claimed in claim 21, wherein said protective layer includes at least one aluminum oxide layer.

* * * * *